Dec. 27, 1955  E. L. LOWE  2,728,402
SHORT-TURN STEERING MECHANISM FOR VEHICLES
Filed Aug. 15, 1952  2 Sheets-Sheet 2
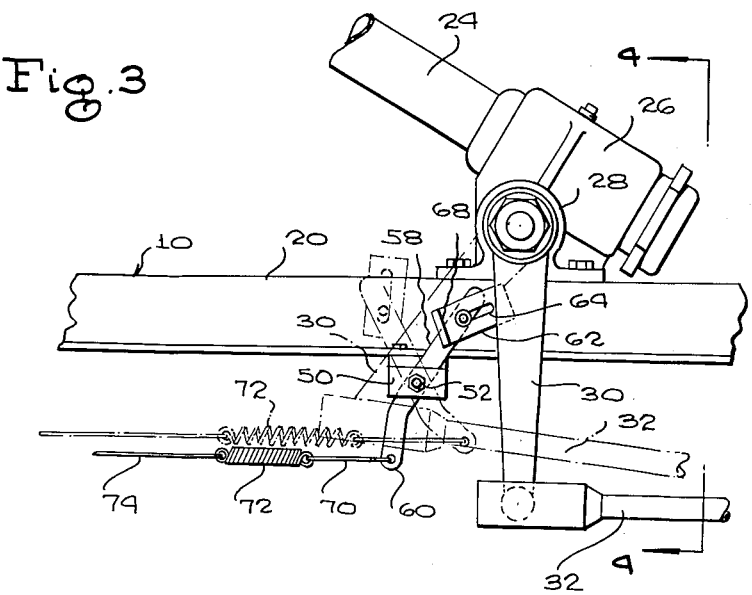
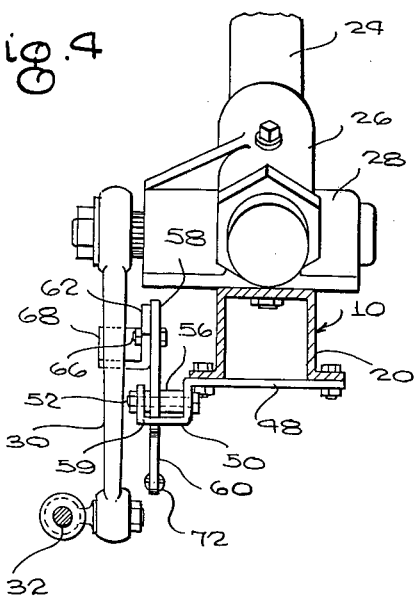
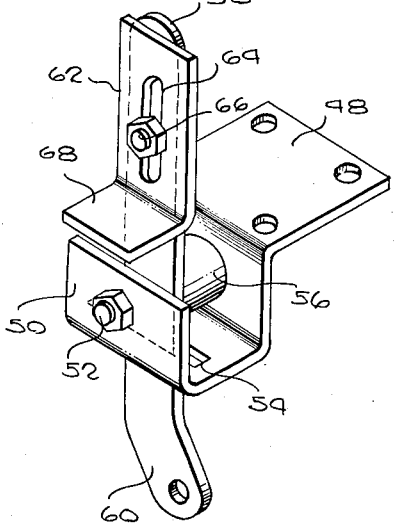
INVENTOR.
EDWARD L. LOWE
BY
McMorrow, Berman & Davidson
ATTORNEYS

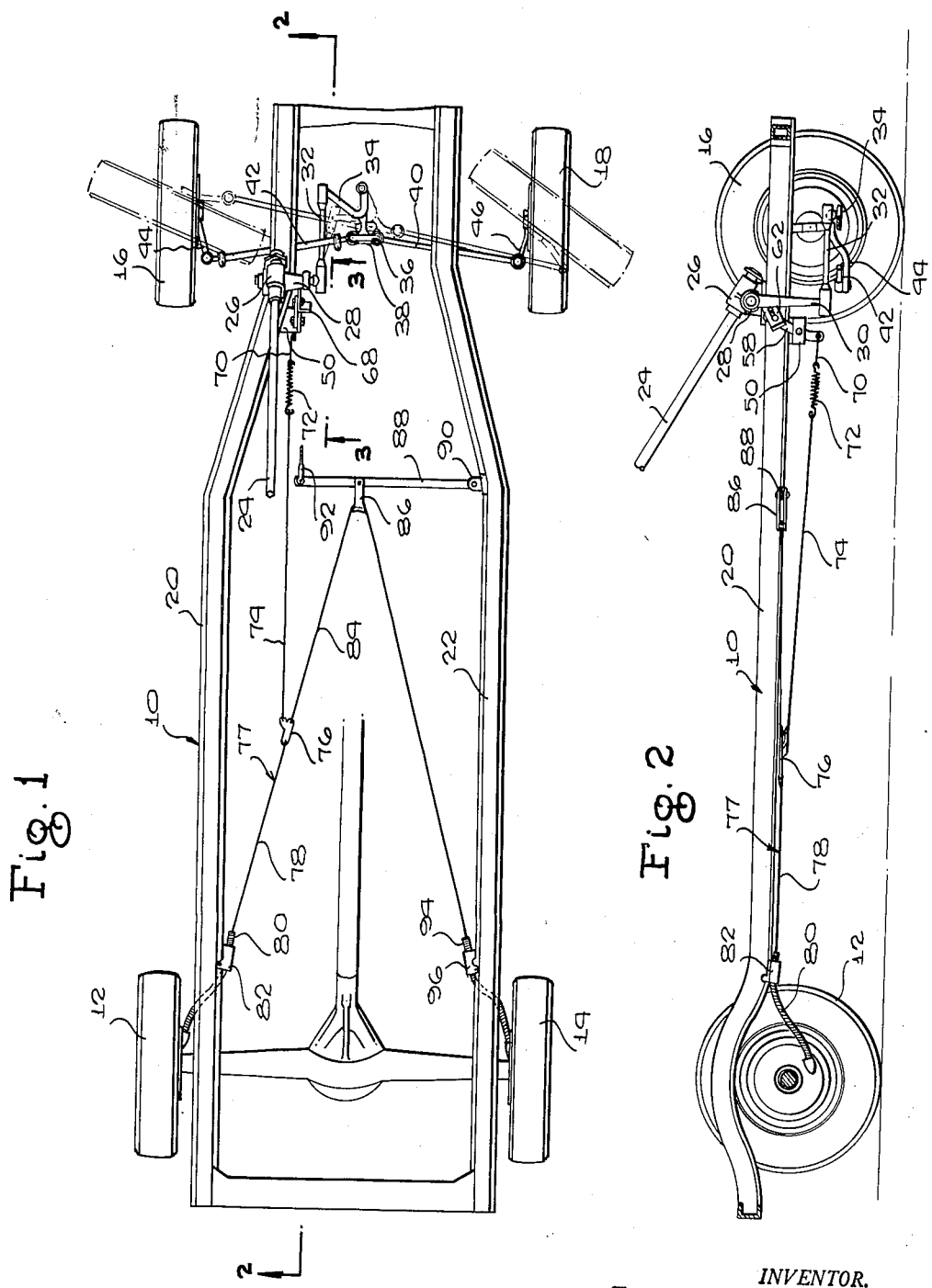

United States Patent Office 2,728,402
Patented Dec. 27, 1955

2,728,402

SHORT-TURN STEERING MECHANISM FOR VEHICLES

Edward L. Lowe, Statesville, N. C.

Application August 15, 1952, Serial No. 304,590

3 Claims. (Cl. 180—6.36)

This invention relates to automotive vehicle steering assemblies, and more particularly, has reference to a mechanism for shortening the turning radius of the vehicle.

It is the principal object of this invention to provide a short-turn steering mechanism for automotive vehicles wherein the mechanism is only coupled to the steering wheel to actuate one brake of the vehicle's emergency brake system, operative only when the steering wheel is turned toward that side of the vehicle on which said one brake is disposed; there being no coupling of the mechanism with the emergency brake system when the steering wheel is turned toward the opposite side of the vehicle.

Another object is to provide an automotive vehicle with a steering mechanism of the character referred to wherein the turning of the vehicle steering wheel to more than a normal extent will be effective to brake automatically only one rear wheel of the vehicle located on that side of the vehicle toward which the front wheels are being turned, thus to bring the pivot point about which the front end of the vehicle turns to or in close proximity to the point of contact between the braked rear wheel and the road surface.

Other objects will appear from the following description, the claims appended thereto, and from the annexed drawings, in which like reference characters designate like parts throughout the several views, and wherein:

Figure 1 is a top plan view of a vehicle frame equipped with the present invention, the dotted lines indicating a position to which the front wheels are turned to set the device in operation;

Figure 2 is a longitudinal section view taken substantially on line 2—2 of Figure 1;

Figure 3 is an enlarged detail sectional view taken substantially on line 3—3 of Figure 1, the dotted lines indicating the position of the parts in their operative, radius-shortening relationship;

Figure 4 is a transverse sectional view on line 4—4 of Figure 3; and

Figure 5 is a perspective view of a mounting bracket and lever constituting a part of the present invention.

Referring to the drawings in detail, the reference numeral 10 has been applied generally to a vehicle frame, said vehicle having left and right rear wheels 12 and 14 respectively, left and right front wheels 16 and 18 respectively, side frame members 20, 22, a steering column 24, a steering gear housing 26, and a laterally projected steering gear housing extension 28. A depending pitman arm 30 is rigid with a shaft extending within said extension, said pitman arm being connected by a universal joint, at its lower end, to the rearwardly disposed end of a connecting shaft 32, the front end of which is connected to the outer end of an angular arm 34. The inner end of the angular arm 34 is rigid with a vertically disposed shaft, that is also rigid with a radius arm 36 connected to link 38, said link being connected at its opposite ends to the inner ends of the tie rods 40, 42, the outer ends of which are pivotally connected to the steering knuckle arms 44, 46 of the front wheels 16, 18 respectively.

The tie rod 42 is adjustable as to length, so as to vary the angular travel ratio of one front wheel relative to the other.

It will be understood that when the shaft contained within the steering column 24, and connected to the vehicle steering wheel (not shown) is rotated responsive to turning of the vehicle steering wheel, the pitman arm 30 will be swung in a vertical plane forwardly or rearwardly, depending upon the direction in which the vehicle is to be turned. When, for example, the vehicle is to be turned to the left, the pitman arm 30 will be swung to the dotted line position thereof shown in Figure 3. The swinging of the pitman arm 30 in a vertical plane shifts the connecting shaft 32 longitudinally of the vehicle, as for example, to the dotted line position of said connecting shaft down in Figure 3. This, in turn, effects swinging movement of the angular arm 34, which rotates the vertically disposed shaft to which the arm 34 is rigidly connected at its inner end. As a result, the radius arm 36 is swung horizontally to left or right, and this in turn transmits longitudinal movement transversely of the front end of the vehicle to the tie rods 40, 42, so as to turn the front wheels 16, 18 in a selected direction.

All this is conventional construction, and does not per se constitute part of the present invention.

In accordance with the present invention, I provide an auxiliary emergency brake actuating mechanism having a support plate 48 (Figures 4 and 5), which underlies the side frame member 20, and is fixedly bolted to said side frame member. Along one side edge, the support plate 48 is integral with a lateral extension 50 formed to a U shape so as to have a horizontally disposed web, and upstanding, transversely spaced side walls.

Extending through registering openings formed in the side walls of the lateral extension 50 is a pivot pin 52, said pivot pin being spaced above the web of said extension and being preferably a conventional bolt to which a nut is applied for the purpose of preventing accidental separation of said pivot pin from the extension 50.

Between the side walls of the extension 50, a spacer sleeve 56 is circumposed about the shank of the pivot pin.

A rockable lever 58 is vertically disposed between the side walls of the extension 50, one end of the spacer sleeve 56 abutting against the intermediate portion of said rockable lever, to space said lever away from the inner side wall of the extension.

Spacing the lever 58 from the outer side wall of the extension 50 is a washer 59.

By reason of this construction, it is seen that the lever 58 is pivotally mounted, intermediate its ends, for swinging movement in a vertical plane, adjacent the pitman arm 30, it being understood that when the upper end portion of the lever is swung rearwardly, the lower end portion of said lever will be swung forwardly of the vehicle.

Integrally formed upon the lower end portion of the lever 58 is a forwardly directed angular extension 60.

As will be noted from Figure 5, the web of the extension 50 is formed with a slot 54, through which the lower end portion of the lever 58 extends, said slot limiting swinging movement of the lever in opposite directions.

Carried by the upper end portion of the lever 58 is a bracket 62 (Figure 5) formed to an L shape, one leg of said bracket having a slot 64 through which extends a bolt 66, said bolt being passed through a suitable opening formed in the upper end portion of the lever 58, thus to connect the slotted leg of the bracket to the upper end portion of the lever. It may be noted, in this connection, that the provision of a slot 64 in said leg of the bracket 62 permits the bracket to be adjusted longitudinally of the lever 58, and also permits the bracket to be adjusted to selected angular positions, as for example that angular position of the bracket shown in Figure 3.

The other leg 68 of the bracket is projected laterally from the lever 58, into the path of travel of the pitman arm 30, see Figure 4.

Thus, when the pitman arm 30 is swung to the dotted line position thereof shown in Figure 3, said pitman arm will engage the laterally projected leg 68 of the bracket 62, and will swing the upper end portion of the lever 58 rearwardly, to the dotted line position shown in Figure 3.

Thus, it will be evident that the auxiliary emergency brake actuating mechanism comprises a support which includes support plate 48 and U-shaped extension 50, and the lever 58 pivotally carried on pin 52 with which L-shaped bracket 62 is adjustably associated.

It is believed important to note, in this regard, that the pitman arm 30 will not engage the laterally extended leg 68 of the bracket 62 unless said pitman arm is swung rearwardly to a substantial extent. Thus, the device constituting the present invention is so designed as to remain inoperative during normal steering of the vehicle, the device becoming operative only when a particularly sharp turn in one direction is to be made. In the illustrated embodiment of the invention, the device becomes operative when a particularly sharp turn to the left is being made. However, as will be apparent from the additional description to be provided hereinafter, the invention could well be adapted to become operative, also, when a right turn is being made.

In any event, when the upper end portion of the lever 58 is swung rearwardly, the lower end portion of said lever, as hereinbefore noted, will be swung forwardly, and connected at one end to said lower end portion is a flexible element including a short, front cable portion 70, said cable portion being connected to one end of a coil spring 72 the convolutions of which are normally closed or substantially closed. At its rear end, the spring 72 is connected to the front end of a long, rear cable portion 74, said rear cable portion extending longitudinally of the vehicle as shown in Figure 1, and being connected at its rearwardly disposed end to a lateral projection on a connecting element 76.

The connecting element 76 constitutes a part of a brake-applying equalizer cable designated generally by the reference numeral 77. The equalizer cable 77 constitutes a conventional part of the emergency brake system of an automotive vehicle, it being necessary merely that said cable be separated intermediate its opposite ends, for connecting the element 76 therein.

The element 76 is connected at one end to the forwardly disposed end of an equalizer cable element 78, said element 78 having its rear end positioned through a flexible cable housing 80, mounted upon the side frame member 20 through the provision of a mounting sleeve 82 attached to said side frame member and circumposed about the housing 80 in clamping engagement with said housing.

The housing 80 extends to the left rear wheel 12, it being understood that the cable element 78 is connected to brake means provided on said left rear wheel, so that on pulling of the element 78 in the direction of its length, toward the front end of the vehicle, the brake will be applied to the left rear wheel.

At its other end, the connecting element 76 is connected to one end of a second equalizer cable element 84, said cable element 84 being passed, intermediate its ends, about a sheave or pulley element 86, which may or may not be equipped with a roller, as desired. The element 86 is pivotally connected to the intermediate portion of a horizontally swingable braking arm 88, one end of which is pivoted as at 90 upon the side frame member 22, the other or free end of the arm 88 being pivotally connected to the rear end of the main emergency brake cable 92. The cable 92, as will be understood, has its front end operatively connected to the emergency brake lever (not shown) of the vehicle.

In other words, the ordinary emergency brake system of the vehicle is applied by operation of the emergency brake lever, said lever when swung in one direction being effective to pull the cable 92 forwardly, thus to swing the arm 88, as a result of which the emergency brakes carried by the rear wheels are applied. The emergency brake of the right rear wheel 14 includes a cable housing 94 into which a cable element 84 extends, said cable housing 94 being connected to the side frame member 22 through the provision of a mounting sleeve 96.

It may be noted that during operation of the vehicle, the emergency brakes will of course be released before movement is imparted to the vehicle. When, during said movement, an ordinary or relatively gradual turn is to be given to the vehicle, the emergency brake system will not be affected in any way, since the pitman arm 30 will not engage the laterally projected leg 58 of the bracket 62.

However, if, during the making of a left turn, it is desired to turn the vehicle on a shorter radius, thus to maneuver it within a particularly small area, the steering wheel is turned more sharply, this being a natural step for the vehicle operator to take when it is desired to turn the vehicle sharply.

As a result, the lever 58 will be engaged by the leg 68, and the lower end portion of the lever will be swung forwardly.

Pull will now be exerted on the flexible element comprising the cable portions 70 and 74 and the spring 72. This, in turn, will exert pull upon the equalizer cable portion 78 extending to the left rear wheel, while simultaneously creating slack in the equalizer cable portion 84 extending to the right rear wheel.

The pull exerted upon the cable portion 78 will cause the brake to be applied to the left rear wheel 12. The left rear wheel will thus be retarded or stopped, simultaneously with application of a proportionately increased amount of power to the right rear wheel.

As a result, the turning radius of the vehicle will be shortened, and the vehicle will be given a high degree of maneuverability, to facilitate parking of the vehicle or turning of the vehicle in a desirably short area.

It will be understood, in this connection, that to facilitate the turning of the vehicle on the shorter radius, the adjustable tie rod 42 will be shortened as to its overall length, thus to case the front wheels to be disposed, when the sharp turn is being made, along lines approximately normal to the radius extending from the pivot point about which the front end of the vehicle is to swing, said pivot point being moved to or in close proximity to the point of contact between the retarded or stopped rear wheel 12 and being spaced from the right front wheel 18 a distance no greater or little greater than the overall length of the vehicle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In an automotive vehicle having an emergency brake system including flexible operating linkage and a steering gear including a steering wheel and a pitman arm swingable in response to rotation of the steering wheel, the improvement consisting of an auxiliary emergency brake actuating mechanism comprising an auxiliary lever mounted for rocking movement in a vertical plane, said lever operatively connected to a portion of the flexible emergency brake operating linkage and adapted to actuate only one brake of said system and at the side of the vehicle adjacent said one brake, said auxiliary emergency brake actuating lever including means adjustably carried thereon to engageably contact the pitman arm at any selected point in its path of travel in only one direction of rotation from its center position, to thereby permit a selected degree of steering wheel rotation in said one direction before the path of travel of the pitman arm responsive to said wheel rotation contacts said means to thus rock said auxiliary lever to thereby cause actuation of one emergency brake of said system at that side of the vehicle toward which said steering wheel is turned.

2. In an automotive vehicle having an emergency brake system including flexible operating linkage and a steering gear including a steering wheel and a pitman arm swingable in response to rotation of the steering wheel, the improvement consisting of an auxiliary brake actuating mechanism comprising a support and an auxiliary lever pivotally carried by said support for rocking movement in a vertical plane, said lever being operatively connected to a portion of said emergency brake operating linkage and adapted to actuate only one brake of said system and at the side of the vehicle adjacent said one brake; means adjustably carried on said lever to engageably contact the pitman arm at any selected point in its path of travel in only one direction of rotation from its center position, to thereby permit a selected degree of steering wheel rotation in said one direction before the path of travel of the pitman arm responsive to said wheel rotation contacts said means to thus rock said auxiliary lever in its vertical plane and cause actuation of said one emergency brake of said system when said steering wheel is turned toward that side.

3. In an automotive vehicle having an emergency brake system including flexible operating linkage and a steering gear including a steering wheel and a pitman arm swingable in response to rotation of the steering wheel, the improvement consisting of an auxiliary emergency brake actuating mechanism comprising a support including a support plate, a U-shaped extension, and an auxiliary lever pivotally carried by said support for rocking movement in a vertical plane, said lever being operatively connected to a portion of said emergency brake operating linkage and adapted to actuate only one brake of said system and at the side of the vehicle adjacent said one brake; means adjustably carried on said lever to engageably contact the pitman arm at any selected point in its path of travel in only one direction of rotation from its center position, to thereby permit a selected degree of steering wheel rotation in said one direction before the path of travel of the pitman arm responsive to said wheel rotation contacts said means to thus pivot said auxiliary lever in its vertical plane and cause actuation of said one emergency brake of said system when said steering wheel is turned toward that side.

References Cited in the file of this patent

UNITED STATES PATENTS

| | | |
|---|---|---|
| 1,323,051 | Hartsough | Nov. 25, 1919 |
| 1,348,558 | Garner et al. | Aug. 3, 1920 |
| 1,476,068 | Froelich | Dec. 4, 1923 |
| 1,583,810 | Stringer | May 11, 1926 |
| 1,613,865 | Anthony | Jan. 11, 1927 |
| 2,249,220 | McCann | July 15, 1941 |
| 2,261,398 | Milster | Nov. 4, 1941 |

FOREIGN PATENTS

| | | |
|---|---|---|
| 178,082 | Switzerland | Sept. 2, 1935 |